(12) United States Patent
Gordon et al.

(10) Patent No.: US 6,434,848 B1
(45) Date of Patent: Aug. 20, 2002

(54) TEMPLATE FOR SCRIBBING ELECTRICAL BOX OPENINGS FOR OLD WORK

(76) Inventors: Kyle L. Gordon, 8008 Kilcash Ct.; James R Malton, 2013 Ashburn La., both of Clemmons, NC (US) 27012

( * ) Notice: Subject to any disclaimer, the term of this patent is extended or adjusted under 35 U.S.C. 154(b) by 0 days.

(21) Appl. No.: 09/245,213

(22) Filed: Feb. 5, 1999

(51) Int. Cl.$^7$ .............................................. G01B 3/14
(52) U.S. Cl. .......................... 33/528; 33/379; 33/382; 33/562
(58) Field of Search .................... 33/DIG. 10, 562, 33/528, 353, 337, 379, 381, 382, 384, 389, 365, 451, 563, 566

(56) References Cited

U.S. PATENT DOCUMENTS

| | | | | |
|---|---|---|---|---|
| 2,733,513 A | * | 2/1956 | Gatineau | 33/528 |
| 2,788,151 A | * | 4/1957 | Shore | 220/3.4 |
| 2,992,490 A | * | 7/1961 | Hay et al. | 33/528 |
| 3,116,563 A | * | 1/1964 | Gelbman | 33/354 |
| 3,435,531 A | * | 4/1969 | Morris | 33/366 |
| 3,745,664 A | | 7/1973 | Altseimer | |
| 3,878,618 A | * | 4/1975 | Freeman | 33/379 |
| 3,966,152 A | | 6/1976 | Bromberg | |
| 4,202,388 A | | 5/1980 | Weiting | |
| 4,304,957 A | | 12/1981 | Slater et al. | |
| 4,339,973 A | | 7/1982 | Lawrence | |
| 4,576,431 A | * | 3/1986 | Thayer | 439/560 |
| D298,421 S | | 11/1988 | Tyroff | |
| 4,793,069 A | | 12/1988 | McDowell | |
| 4,802,284 A | * | 2/1989 | Jackson | 33/528 |
| 4,850,115 A | | 7/1989 | Price et al. | |
| 4,888,880 A | * | 12/1989 | Parker | 33/645 |
| 4,953,733 A | | 9/1990 | Loscuito | |
| 5,148,108 A | * | 9/1992 | Dufour | 33/365 |
| 5,222,303 A | * | 6/1993 | Jardine | 33/528 |
| 5,361,509 A | | 11/1994 | Wheeler, Sr. et al. | |
| 5,434,359 A | | 7/1995 | Schnell | |
| 5,507,098 A | * | 4/1996 | Schaver, Jr. | 33/371 |
| 5,560,116 A | | 10/1996 | Tobia | |
| 5,613,811 A | * | 3/1997 | Tilemans | 409/130 |
| 5,630,281 A | | 5/1997 | Pledger et al. | |
| 5,813,130 A | * | 9/1998 | MacDowell | 33/528 |
| 6,209,214 B1 | * | 4/2001 | Talavera | 33/528 |
| 6,223,445 B1 | * | 5/2001 | Schuette, Jr. et al. | 33/528 |

FOREIGN PATENT DOCUMENTS

GB  2274166  * 7/1994 ................. 33/377

* cited by examiner

Primary Examiner—Diego Guiterrez
Assistant Examiner—Lydia M. De Jésus
(74) Attorney, Agent, or Firm—Robert W. Pitts (57) ABSTRACT

A template 10 can be used to mark or scribe either a single gang opening or a dual gang opening for mounting an electrical box in a wall. The template is especially adapted to mark openings for "old work" boxes mounted directly to drywall. The template 10 includes a vertical level 16 and a horizontal level 18 protruding from the front face of the template 10 so that the template can be squared in either a horizontal or a vertical orientation. The level are mounted in housings 20, 30 that protrude far enough to form finger grips. The openings are cut around the periphery of the template and vertical slots 38, 44 are provided intermediate the sides of the template to form an opening for a single gang box. A dual gang box opening can be marked primarily using the peripheral edges of the template 10. Rectangular protruding sections 28, 36 and 40 provide clearance for tabs located on "old work" boxes and one of these protrusions 28 includes a slot for defining a portion of a dual gang box opening.

23 Claims, 7 Drawing Sheets

TEMPLATE FOR SCRIBBING ELECTRICAL BOX OPENINGS FOR OLD WORK

BACKGROUND OF THE INVENTION

1. Field of the Invention

This invention is related to a template that is used to mark openings in a wall or partition for electrical boxes. More specifically, this invention is intended for use in marking openings for "old work" boxes of the type that can be attached directly to a partition or drywall. This invention is also directed to templates for markingssingle and dual gang boxes for applications in which additional branch wiring components are to be added and for the installation of local area network components in an existing structure.

2. Description of the Prior Art

When used with reference to the installation of electrical systems and wiring in buildings, the term "old work" refers to the installation of additional components to existing wiring or electrical systems or to the installation of additional wiring and components in an existing structure. The most common example is the installation of a new electrical outlet along a preexisting electrical branch. Since the existing wiring is normally located behind a wall or partition, such as drywall, an opening must first be cut in the desired location. Normally this location is chosen to provide access to the wires behind the drywall or other partition. To comply with applicable codes, an electrical box must then be. inserted into the opening. Since it is most unlikely that the newly formed opening will be in a position in which the newly installed box can be attached to a stud or other structural member, some means must be provided to attach the electrical box directly to the drywall or other partition.

A number of so-called "old work" electrical boxes include a screw mounted tab that can be rotated into position behind the drywall after the "old work" box has been inserted into the new opening. These tabs are normally mounted on a screw that is accessible from the front of the box. When the "old work" box is initially inserted through the wall opening, the tab is located in a retracted position in which the tab lies along an external face of the box. Normally tabs are located on the top and bottom of the "old work" box. After the box has been inserted, the screws to which the tabs are attached are rotated. The tabs are rotatable through an arc of ninety degrees. The face of the box provides a stop in the retracted position and a ridge extending at right angles to the box wall provides a second stop against which the tab abuts when rotated to the extended position. When in the extended position, the tab engages the area around the edge of the opening in the drywall.

Most of the "old work" boxes of this type are plastic or nonmetallic. In the most commonly used nonmetallic "old work" box, the tabs protrude from the top and bottom faces of the box even in the retracted orientation. Therefore, the opening in the drywall must provide clearance for the tabs, but it must not be so large that the tabs will not engage the dry wall along a length sufficient to adequately secure the "old work" box. Other commercially available boxes of this type include a step in the top and bottom wall so that a rectangular opening will provide clearance for the tab. This configuration, however, reduces the interior volume of the box. Examples of old work nonmetallic boxes include CARLON plastic boxes manufactured by Lamson & Sessions, old work plastic boxes manufactured by SLATER, and boxes manufactured by Allied Moulded of Bryan Ohio. Old work style boxes are also described in U.S. Pat. No. 3,966,152; U.S. Pat. No. 4,304,957; and U.S. Pat. No. 5,434,359.

In addition to these standard nonmetallic "old work" boxes, there are some metallic "old work" boxes. These metallic versions generally include tabs located on the sides of the box that are outwardly deflected by screws or spring tabs that extend beyond the sides of the boxes.

"Old work" boxes are not confined to standard single gang boxes that have an internal volume of approximately fourteen to eighteen cubic inches. In some applications, dual gang boxes, suitable for mounting two electrical devices are employed. "Old work" dual gang boxes have an internal volume of approximately twenty-five to twenty-eight cubic inches and have rotatable tabs at diagonally opposite corners of the top and bottom faces.

Although "old work" boxes are commonly employed to add electrical devices to conventional wiring branch circuits used rated at 12 VAC, they can also be used for installing low voltage or class 2 wiring components. Applications of this latter type have become increasingly prevalent due to the installation of local area network computer systems. In these applications, "old work" boxes are located as needed for network outlets and the low voltage cables are fished behind the pre-exiting wall partitions, commonly drywall. Installations of this type are needed not only to upgrade existing office complexes, but are also required in many manufacturing applications. However, aesthetic considerations dictate, especially in offices, that the outlets using these "old work" boxes be neat. If the boxes are not installed so that they are level, faceplates that are subsequently screwed to the boxes will not be level. If the openings through which the "old work" boxes are to be inserted are excessively large, undesirable cracks may be visible around the edges of the faceplates or it may be necessary to fill in these cracks as part of a labor intensive, and therefore expensive operation. Therefore it is important that some means be provided for cutting openings that are level and that are as small as possible so that the "old work" boxes can be securely mounted and so that no cracks are visible after installation of a faceplate to the box.

Commonly paper templates are supplied with "old work" boxes to permit an installer to mark the shape of the opening into which the box will be inserted. However, these paper templates provide no means for squaring the opening so that the sides with be vertical and the top and bottom horizontal. In other words other tools are necessary to level the template, an many installers merely eyeball the orientation of the template and the resultant opening. Another means of cutting openings in drywall is to employ a template that allows an installer to either trace the location of the opening or to cut the opening using a drywall cutter or zip tool. Examples of these prior art templates are shown in U.S. Pat. No. 4,793,069 and in U.S. Pat. No. 5,222,303. The later patent includes both horizontal and vertical levels to orient an opening the size of a single gang box in a vertical orientation. That device also employs an extension for locating the box at an outlet box height relative to a floor. However, that template is bulky and is not suited to orienting boxes in vertical or horizontal orientations, and being primarily intended for use with conventional duplex outlets, is not suited for mounting boxes in tight locations. Furthermore that device only provides a template for a single gang box. U.S. Pat. No. 4,793,069 does provide templates for both single gang and dual gang boxes, but because the box opening is defined by the edges of two separate internal openings in a flat plate, that template is also rather bulky and is not suitable for all uses of "old work" boxes.

Therefore a template that is suitable for marking either single or dual gang boxes in various locations, both for installation of additional components on existing. wiring, and for installing new wiring systems, such as local area networks, is needed. This template should be especially suited for use in installing "old work" single or dual gang boxes. The template should also be easily gripped and manipulatable, and it should be easy for an installer to position the template and various orientations and positions while still maintaining the template level or perpendicular to a plumb or horizontal line. The template should also be inexpensive to manufacture and should use conventional off the shelf bubble type levels to permit an installer to properly orient the template.

SUMMARY OF THE INVENTION

These objectives can be realized by employing a template for use in cutting an opening in an existing wall for installation of an old work electrical box. The template comprises a plate having edges defining the shape of an opening through which an old work electrical box can be inserted. The plate includes spaced apart gripping protrusions extending beyond a front surface and a level positioned between spaced gripping surfaces so that the template can be oriented relative to a plumb line.

This template for use in outlining an opening in a panel for installation of an old work electrical box in a panel comprises a plate having a width equal to the width of a dual gang old work electrical box opening with sections along a top and a bottom edge protruding from adjacent edge sections to define areas for clearance of an old work dual gang electrical box latch for insertion therein. The plate includes an additional section along one of the top and bottom edges with a horizontal slot extending through the additional section for defining a portion of the opening adjacent to the protruding section along the one top or bottom edge. The plate also includes at least one vertical slot so that the vertical slot is spaced from one side of the plate by a distance equal to the width of a single gang old work electrical box, the additional section along the top or bottom edge of the template defining an opening for clearance of an old work single gang electrical latch.

This template compriseia tool for use in cutting a hole in a wall for the installation of an electrical box. Templates for "old work" and new boxes would employ many of the same features with the periphery of the template being defined by the specific application. The tool comprises a flat member having peripheral edges, the peripheral edges being dimensioned to define a dual gang box opening,. A portion of the peripheral edges also are dimensioned to define a portion of a single gang box The flat member has at least one slot, the slot defining a remaining portion of the single gang box opening.

DETAILED DESCRIPTION OF THE PREFERRED EMBODIMENT

The template 10 comprising the preferred embodiment of this invention comprises a plate that is dimensioned to provide peripheral surfaces positioned to correspond to the edges of both a single gang opening into which a single gang electrical box can be inserted and a dual gang opening into which a dual gang electrical box can be inserted. Unlike other templates, the template 10 is intended to be positioned on a wall or partition and the edges of the slots are to be marked by scribing around the top and side edges. In other words, the template 10 will be positioned in the middle of the opening to be formed in drywall or other partitions. The template 10 does not have an interior opening or openings which define the side edges of the opening.

The preferred embodiment of the template 10 is preferable formed of a substantially flat plate 12 with housings 20 and 30 protruding from the front face of the flat plate 12 for mounting two bubble type levels 16 and 18. The housings 20 and 30 along with flat plate sections 12 preferably comprise integrally molded sections of the template 10. In the preferred embodiment, this one-piece unitary molded member is injection molded from a material, such as polycarbonate, although other conventional thermoplatic or thermoset resins could also be used.

The flat portion 12 of the template 10 is divided into two sections. The first section 14 can be referred to as the single gang plate section, because peripheral edges define the contour of an opening for a single gang electrical box. This single gang plate section 14 is joined to a dual gang plate section 22 by a center web 26. Side edges 32 and 34 on opposite sides of the two plate sections are spaced apart by a distance equal to the width of a standard dual gang electrical box. Therefore both the single gang section 14 and the dual gang section 22 together form most of the dual gang box opening outline, and these two plate sections do not independently form separate templates. As will be subsequently discussed in greater detail, suitable portions of the the top and bottom edges of the plate 12 must be selected to form the top and bottom outlines of single gang and dual gang openings.

The level housings 20 and 30 not only form receptacles in which the levels 16 and 18 are mounted, but these two raised housings also provide means for gripping the template 10 when positioned on a wall to mark an electrical gang opening. These protruding housings 20 and 30 extend from the front of the surrounding plate 12 by a distance sufficient to permit a user or installer to grip the ends 60 of the housings 20, 30 while the outline of the electrical box opening is traced or scribed around the periphery of the template. An installer can grip the protruding end caps 60 with two fingers of one hand while using the other hand to trace the outline of the opening to be formed in the drywall or other partition. The installer can grip the end caps 60 on either the horizontal level housing 20 or the vertical level housing 30.

The bubble levels or vials 16 and 18 are conventional cylindrical levels. Although other commercially available bubble type levels can be employed, the preferred embodiment uses bubble level manufactured by Johnson Level & Tool. These levels 16, 18 are inserted into the level housings 20, 30 through slots 46, 48 in the rear of the template 10. Each level housing 20, 30 includes two sidewalls 54 that are integral with two end caps 60. Two tapered ramp stops 56 are located on each sidewall 54 and the bubble levels, which comprise an outer tube fabricated from a material that yields or deflects during insertion, are inserted past the inclined stops 56 until the cylindrical bubble level is fully inserted into the housing. Each stop 56 has a shoulder at its widest end that abuts the level tube to prevent the level from slipping out of the respective slot 46, 48. The end caps 60 each include a cylindrical overhang that engage the ends of the levels 16, 18 to provide a stop on the front face of the template 10.

One level 16, 18 and one level housing 20, 30 is located on each of the two sections 14, 22 of the template 10. Level 18 extends horizontally so that it can be used to properly orient the template in the normal horizontal configuration shown in FIG. 1. Level 16 extends vertically so that if the template is positioned at right angles relative to the position shown in FIG. 1, the level 16 can be employed to maintain the edges of the template in true horizontal and vertical configurations.

Figure 1:
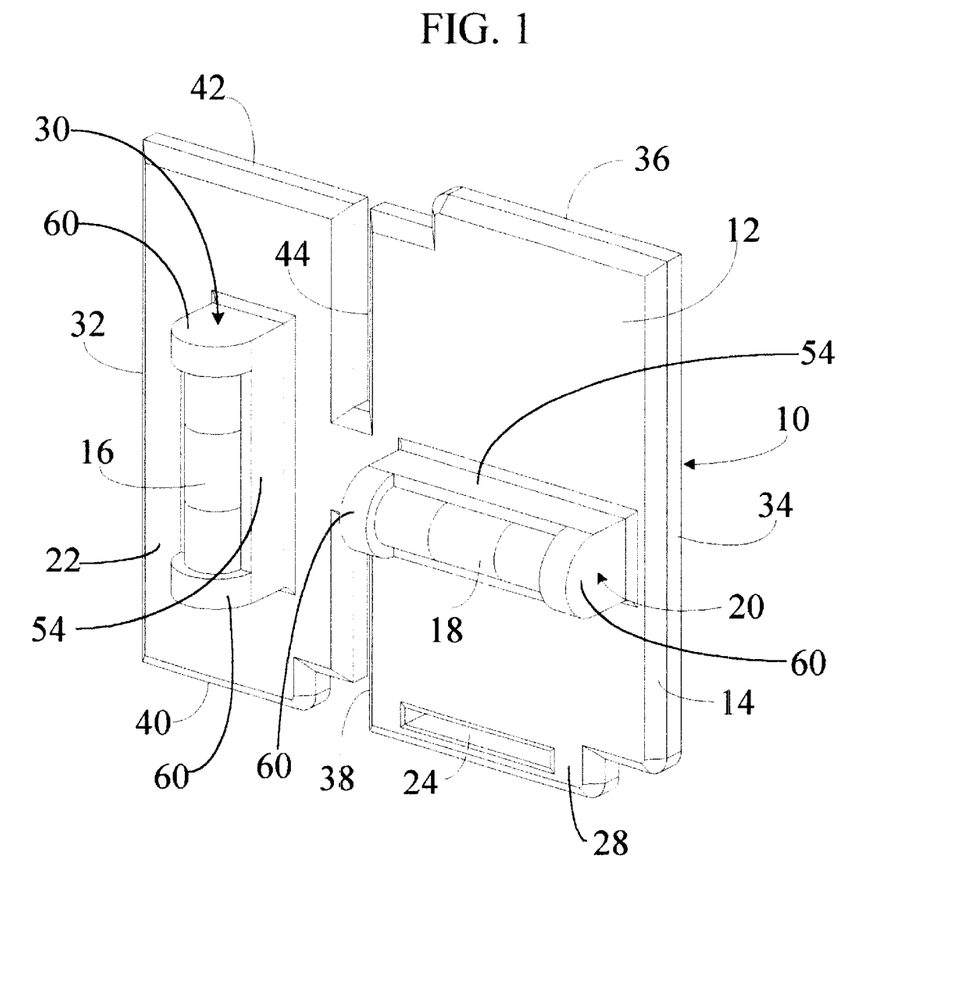
FIG. 1 is a three dimensional view showing the front face of a template for single and dual gang "old work" style electrical boxes showing two level positioned at right angles.
Figure 2:
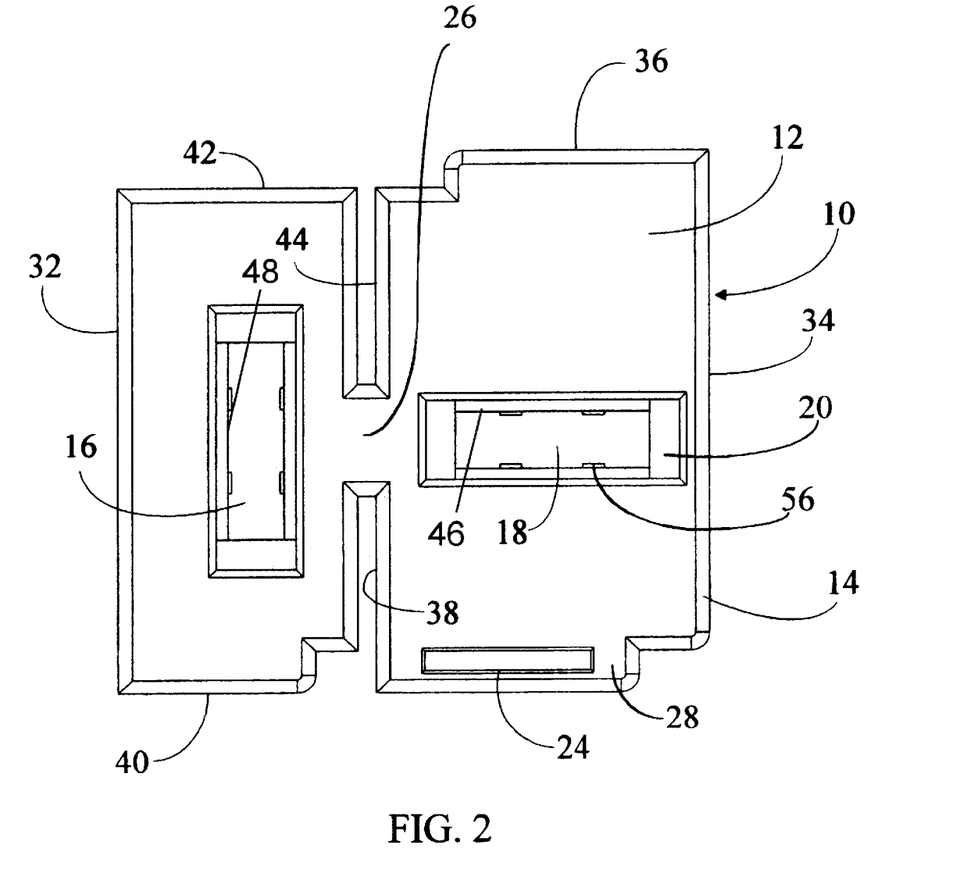
FIG. 2 is a view of the front face the plate forming the template shown in FIG. 1 with two bubble type levels removed.
Figure 3:
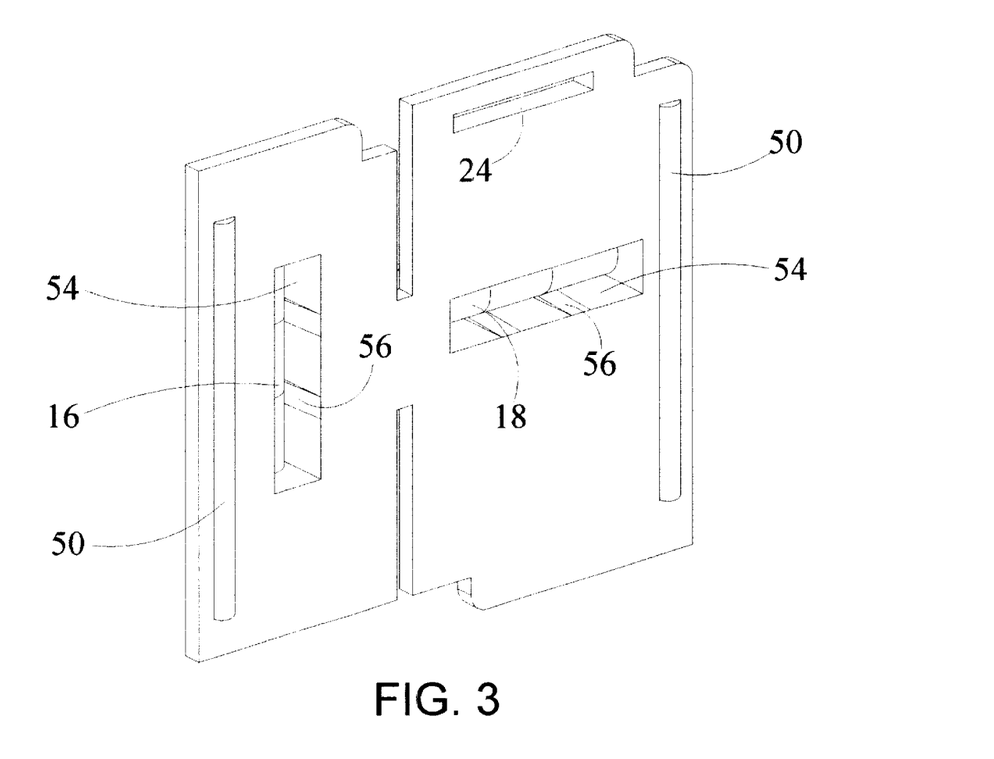
FIG. 3 is a three dimensional view of the rear of the template shown in FIG. 1.
Figure 4:
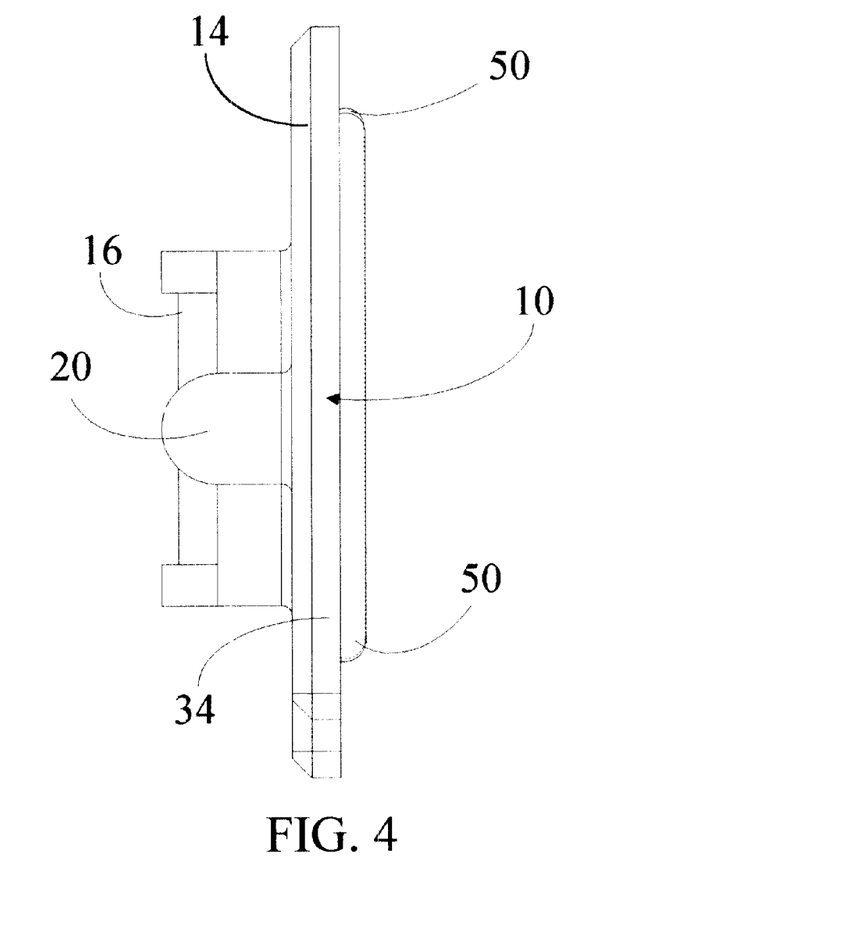
FIG. 4 is a side view of the template showing the manner in which the bubble levels protrude from the front face of the template and in which compressible non-slip pads protrude from the rear of the rear face of the level.
Figure 5:
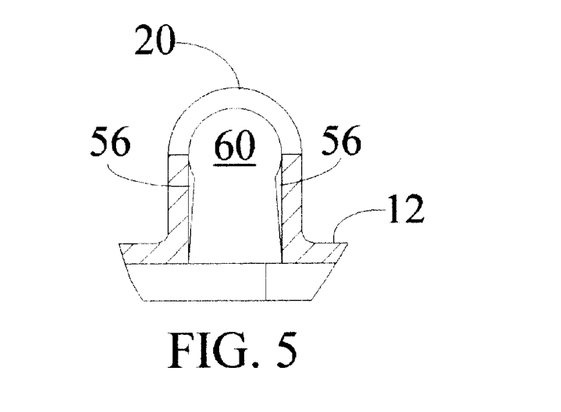
FIG. 5 is a fragmentary view showing the manner in which the bubble type levels are secured in the template.

The peripheral edges of the template 10 are beveled to provide adequate clearance for a marking tool such as a pencil or a knife. In addition to the outer edges, which define portions of either a single or dual gang box opening, the template 10 also includes two vertical slots 38 and 44 on opposite sides of the center web 26 joining the two template sections 14 and 22. These slots 38 and 44 are spaced from the opposite side of template section 14 by a distance approximately equal to the width of a single gang electrical box. More precisely, this dimension is sufficient to permit insertion of a single gang electrical box through an opening defined by template section 14. When an installer scribes or marks a line formed by the top, bottom, and right side edge of section 14, as shown in FIGS. 1 and 2, and by the edges formed by the slots 38 and 44, the installer can outline an opening for receiving a single gang "old work" electrical box. Although the marked line would not extend through the small area blocked by web section 26, the two lines marked by the edges of slots 38, 44 will be collinear and will be separated only by a small gap. The preferred embodiment of template is specifically dimensioned for insertion of a fourteen cubic inch CARLON "old work" box manufactured by Lamson and Sessions, but the same outline will be suitable for other similar "old work" electrical boxes. Other templates differing only in their relative size can be employed for boxes that may be significantly larger or smaller than this commonly used "old work" box.

The rectangular ridges, extensions or protruding sections 28 and 36 formed along opposite diagonal corners of the top and bottom of the template section 14 are dimensioned to provide clearance for a rotatable tab located in the corresponding positions on a commercially available single gang "old work" electrical box. By leaving gaps adjacent the ends of these protruding sections 28 and 36, the electrical box will be more securely positioned in the resultant opening and will not rotate from the square orientation established by employing the levels 16, 18 as the opening is marked. The box will also be less likely to slip or move with time. By making the opening as small as reasonably possible, front flanges on the box and the rotatable tabs will engage a larger surface and will be more secure. There will also be less chance that the edges of the drywall will deteriorate with time when subjected to the compressive forces holding the box in place.

To outline an electrical box opening for a dual gang "old work" box the side edges 32 and 34 define the sides of the dual gang opening. The top of the template 10 defines the top of the dual gang opening with the rectangular protrusion at the right of the top edge, as shown in FIG. 2, provides clearance for the top rotatable tab located at the top right hand corner of the box. The rectangular projection 40 at the lower left of the template section 22 provides clearance for the lower rotatable tab on the dual gang "old work" box. A horizontal slot 24 extends through the single gang rectangular projection 28. This slot 24, together with other surfaces aligned with slot 24 defines the remainder of the lower edge of the dual gang box opening.

Rubber strips 50 are located on the rear face of the template 10, roughly along the opposite sides of the template. These soft strips and cylindrical in shape and protrude from the rear surface. Pads 50 engage the drywall or other partition or wall on which an opening is to be marked using template 10. Since these strips are deformable, and are preferably formed of a rubber or elastomer, they provide a non-stick surface to engage the drywall or panel so that the template remains in its desired location and does not slip while the outline of the opening is being marked or scribed. Strips 50 may be snapped into grooves on the rear face of the template 10.

Figure 6:
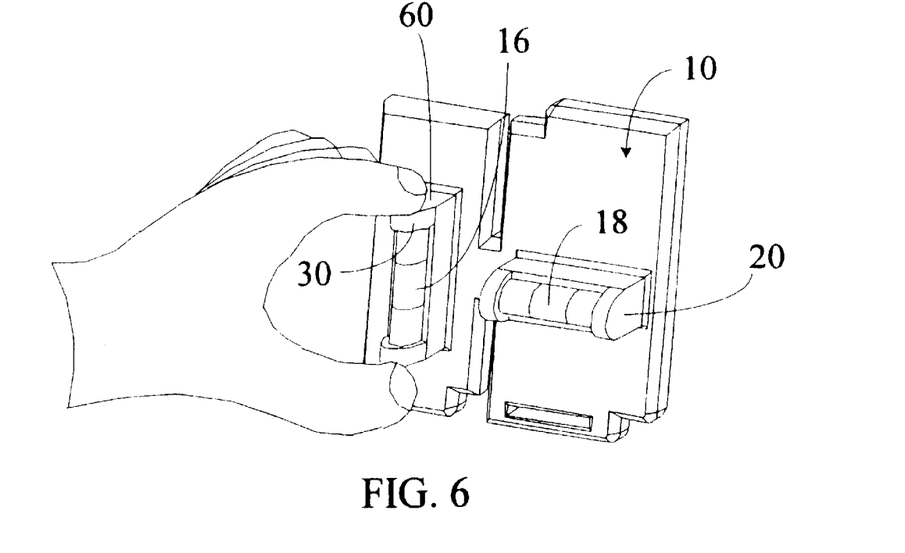
FIG. 6 is a view showing the manner in which an installer would grip the template.
Figure 7:
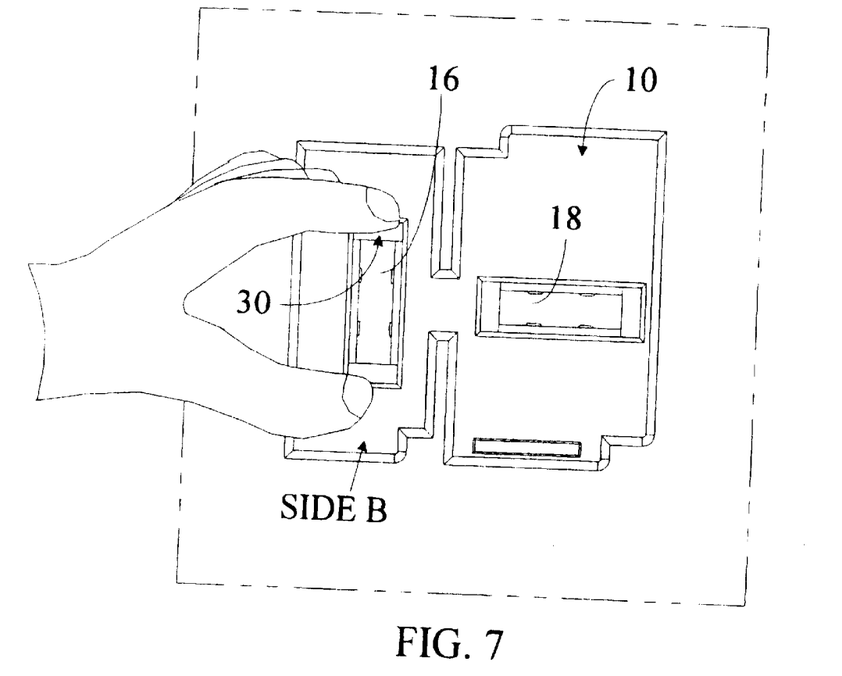
FIG. 7 is a view showing the manner in which the template is positioned on a wall to mark an opening for insertion of an electrical wall box.
Figure 8:
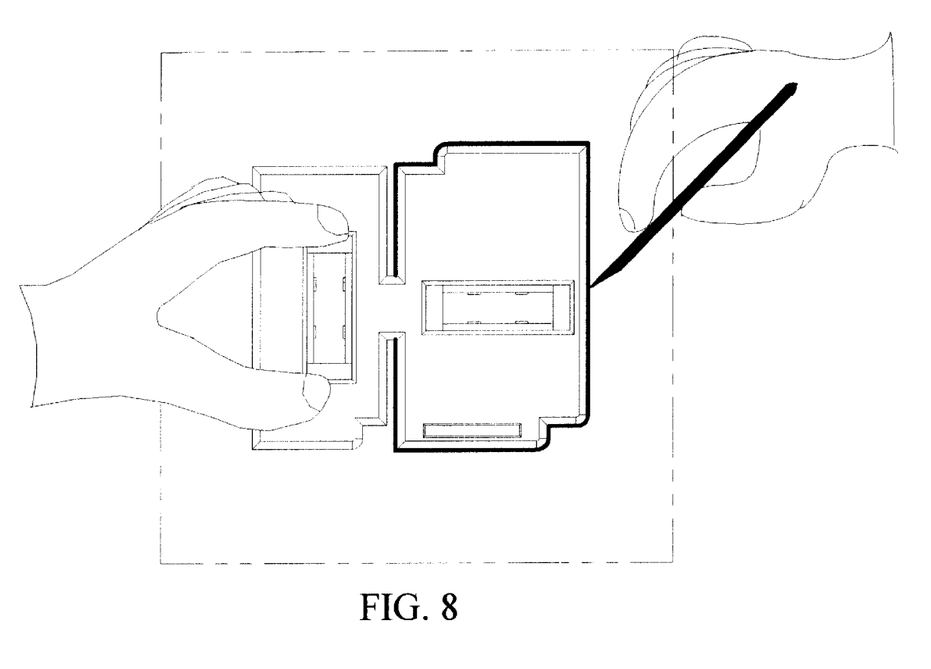
FIG. 8 is a view showing the manner in which an installer would mark or scribe the outline of a single gang wall box using the template.
Figure 9:
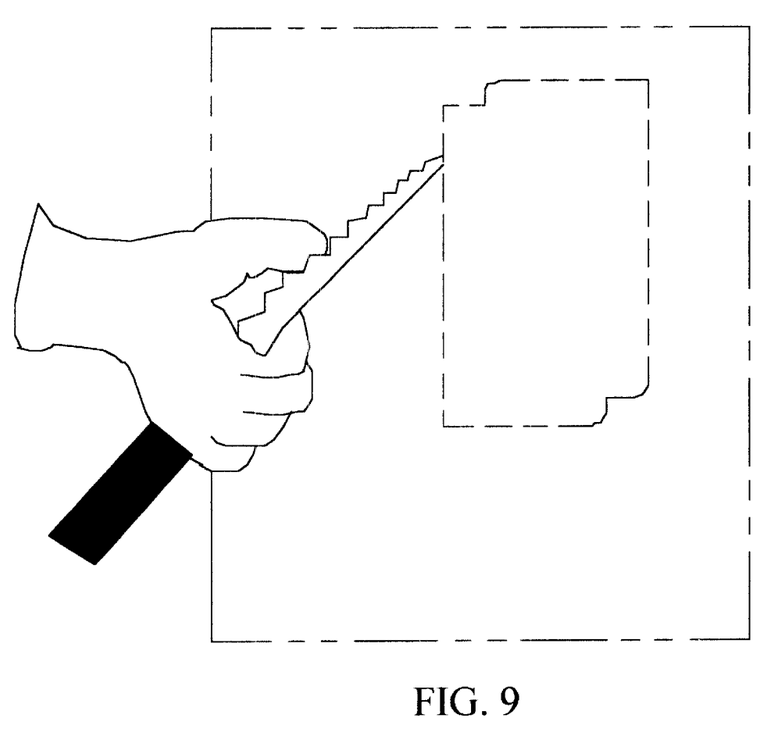
FIG. 9 is a view showing the manner in which the opening would be cut using a drywall saw or other tool to cut an opening in a partition.

FIGS. 6–9 show the manner in which a single gang opening is first marked and then cut using the template 10. FIG. 6 shows the manner in which an installer would grasp the end caps 60 on either of the level housings 20, 30 between a thumb and a forefinger of one hand to use these protrusions as finger grips to both grasp and manipulate the template 10. FIG. 7 shown the template 10 being positioned on a wall with the single gang section 14 being properly positioned using the bubble level 18. Note that the installer has gripped the vertical level 16, leaving the horizontal level unobstructed. In this manner, the opening for a single gang "old work" box can be located using one hand to hold the template 10 and the other hand to mark the box outline as shown in FIG. 8. Note that the strips 50 will prevent the template 10 from slipping as the installer marks the opening by tracing around the periphery of the template section 14, including the slots 38 and 44. An opening can then be cut with appropriate clearance for inserting the locking tabs on an "old work" box as shown in FIG. 9.

A dual gage opening can be marked in substantially the same manner, taking care to use the appropriate surfaces to mark this opening. The template can also be rotated through ninety degrees to orient the template at right angles to the orientation shown in FIGS. 7–9.

Although this invention is especially adapted for use in marking openings for "old work" boxes, a template employing at least one protruding level could also be used to make an electrical outlet opening or network outlet opening as part of new construction. The only difference would be in the shape of the template, which would then need to conform to a standard single or dual gang opening. Individual components could also be modified. For example, the template could be stamped and formed from metal. Marking means, such as ink or serrations could be employed along the outer edges to define portions of the openings. Other leveling means could also be employed. Felt pads could be substituted for the deformable spherical pads used in this embodiment. Therefore the invention described in terms of the representative or preferred embodiment is defined by the claims and not be the single embodiment described herein in detail.

We claim:

1. A template for use in cutting an opening in an existing wall for installation of an old work electrical, box, the template comprising a plate having edges defining the shape of an opening through which an old work electrical box is to be inserted, the plate including spaced apart gripping protrusions extending beyond a front surface and a level positioned between spaced gripping protrusions so that the template can be oriented relative to a plumb line, wherein outer edges of the plate have a shape for defining a dual gang opening into which a dual gang old work box cam be inserted and wherein the plate includes slots for defining a portion of a single gang opening into which a single gang old work box can be inserted.

2. The template of claim 1 wherein a horizontal level and a vertical level are positioned on the front surface of the template.

3. The template of claim 1 wherein the level comprises a bubble level.

4. The template of claim 1 wherein edges of the plate defining the slot are beveled to provide space for either a marking tool or a scribing tool.

5. The template of claim 1 wherein two slots are located on opposite sides of a center web joining two template sections, the center web having a height that is small compared to a dimension between a top edge and a bottom edge of the template, the slots having a combined length that it greater than the height of the center web so that lines scribed using the two slots will be collinear and separated by only a small gap.

6. The template of claim 1 wherein the plate includes vertical and horizontal slots.

7. The template of claim 1 wherein the plate includes extensions along opposite upper and lower edges to define a portion of an opening through which retaining tabs on old work boxes can be inserted.

8. The template of claim 1 wherein the plate includes an opening through a rear surface between the spaced apart gripping protrusions, the level being inserted between the gripping protrusions through the opening in the rear of the plate.

9. The template of claim 1 wherein the gripping protrusions extend above the front surface for a sufficient height to permit the template to be gripped between an operator's fingers.

10. The template of claim 1 wherein two mutually perpendicular levels are located on a front surface of the plate.

11. The template of claim 1 wherein strips extend from the rear face of the template, the strips being engagable with the wall to prevent the template from slipping.

12. The template of claim 11 wherein the pads are secured to the rear face of the template and are relatively more deformable than the plate.

13. The template of claim 1 wherein a level is inserted into a level housing protruding beyond a front face of the template, the housing including sidewalls and end caps, the sidewalls having ramp surfaces forming stops preventing retraction of the level rearwardly from the template and the end caps providing a front stop engaged by the level.

14. A template for use in outlining an opening in a panel for installation of an old work electrical box in a panel, the template comprising: a one piece plate having a width equal to the width of a dual gang old work electrical box opening with sections along a top and a bottom edge protruding from adjacent edge sections to define areas for clearance of an old work dual gang electrical box latch for insertion therein, the plate including an additional section along only one of the top and bottom edges with a horizontal slot extending through the additional section for defining a portion of the opening adjacent to the protruding section along the one top or bottom edge, the plate also including at least one vertical slot so that the vertical slot is spaced from one side of the plate by a distance equal to the width of a single gang old work electrical box, the additional section along the top or bottom edge of the template defining an opening for clearance of an old work single gang electrical latch.

15. The template of claim 14 including horizontal and vertical levels for positioning the template relative to a vertical axis.

16. A tool for use in cutting a hole in a wall for the installation of an electrical box, the tool comprising a flat member having peripheral edges, the peripheral,edges being dimensioned to define a dual gang box opening, a portion of the peripheral edges also being dimensioned to define a portion of a single gang box opening, the flat member having at least one slot, the slot defining a remaining portion of the single gang box-opening, the slot and the portion of the peripheral edges defining a single box opening.

17. The tool of claim 16, wherein at least one level is positioned on the flat member so that the tool can be positioned relative to a vertical line.

18. The tool of claim 17, wherein two mutually perpendicular levels are positioned on the flat member.

19. The tool of claim 18 wherein the level protrudes beyond the front of the flat member and is mounted between end caps that extend beyond the flat member by a distance sufficient to be gripped by an installer.

20. A template for use in outlining an opening in a panel for installation of an old work electrical box in a drywall panel, the template comprising: a one piece plate having a width equal to the width of a dual gang old work electrical box opening with sections along a top and a bottom edge protruding from adjacent edge sections to define areas for clearance of an old work dual gang electrical box latch for insertion therein, the plate including at least one vertical slot so that the vertical slot is spaced from one side of the plate by a distance equal to the width of a single gang old work electrical box, the additional section along the top or bottom edge of the template defining an opening for clearance of an old work single gang electrical latch, the template also including at least one gripping protrusion extending from a front surface of the plate between the top and bottom edges of the plate and between edge sections of the plate.

21. The template of claim 20 including at least one pair of gripping protrusions spaced apart to permit a user to grip the gripping protrusions with two fingers of one hand.

22. The template of claim 20, including two pairs of gripping protrusions with gripping protrusions in the first pair extending horizontally and with gripping protrusions in the second pair extending vertically.

23. The template of claim 20 including deformable protrusions extending from a rear surface of the plate, the deformable protrusions comprising means for preventing slippage of the template when positioned on the drywall panel.

* * * * *